United States Patent
Fishman et al.

(10) Patent No.: US 7,202,995 B2
(45) Date of Patent: Apr. 10, 2007

(54) METHOD AND APPARATUS FOR COMMUNICATING STATUS IN A LIGHTWAVE COMMUNICATION SYSTEM EMPLOYING OPTICAL AMPLIFIERS

(75) Inventors: Daniel A. Fishman, Lakewood, NJ (US); Mahan Movassaghi, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 292 days.

(21) Appl. No.: 10/464,726

(22) Filed: Jun. 18, 2003

(65) Prior Publication Data

US 2004/0257642 A1    Dec. 23, 2004

(51) Int. Cl.
*H01S 4/00*       (2006.01)
*H04B 10/12*    (2006.01)

(52) U.S. Cl. ...................................... 359/334; 398/181
(58) Field of Classification Search ................ 359/334; 398/191, 181
See application file for complete search history.

(56) References Cited

U.S. PATENT DOCUMENTS

| 5,745,274 | A | * | 4/1998 | Fatehi et al. | 398/198 |
|---|---|---|---|---|---|
| 5,812,289 | A | * | 9/1998 | Tomooka et al. | 398/92 |
| 5,861,980 | A | * | 1/1999 | Ono | 359/337.12 |
| 6,452,721 | B2 | * | 9/2002 | Deguchi et al. | 359/341.33 |
| 6,930,823 | B2 | * | 8/2005 | Nakamoto et al. | 359/334 |
| 6,980,745 | B2 | * | 12/2005 | Deguchi et al. | 398/177 |
| 2001/0050807 | A1 | * | 12/2001 | Deguchi et al. | 359/341.44 |
| 2002/0114061 | A1 | * | 8/2002 | Naito et al. | 359/334 |
| 2003/0011855 | A1 | * | 1/2003 | Fujiwara | 359/177 |
| 2003/0030860 | A1 | * | 2/2003 | Mellert et al. | 359/110 |
| 2003/0030861 | A1 | * | 2/2003 | Mellert et al. | 359/110 |
| 2003/0035184 | A1 | * | 2/2003 | Deguchi et al. | 359/177 |
| 2005/0078351 | A1 | * | 4/2005 | Avallone et al. | 359/334 |
| 2005/0117839 | A1 | * | 6/2005 | Avallone et al. | 385/24 |

* cited by examiner

*Primary Examiner*—Jack Keith
*Assistant Examiner*—Eric Bolda

(57) ABSTRACT

A repeater node for an optical transmission system provides amplification of optical signals and uses a modulated pump signal to transfer status information about the repeater node to a control system via an optical supervisory signal. The pump signal supplied by a pump source to an optical amplifier is modulated with one or more tones that are indicative of status in the repeater node. In a transmission fiber coupled to the output of the optical amplifier, the modulation of the pump signal is transferred to the supervisory signal of the optical transmission system as a result of Raman effect. More specifically, the pump wavelength and the supervisory signal wavelength are such that the modulated tone on the shorter wavelength pump signal is transferred to the longer wavelength supervisory signal. The tone can then be extracted from the supervisory signal and processed at another node in the system.

8 Claims, 3 Drawing Sheets

METHOD AND APPARATUS FOR COMMUNICATING STATUS IN A LIGHTWAVE COMMUNICATION SYSTEM EMPLOYING OPTICAL AMPLIFIERS

TECHNICAL FIELD

The invention relates generally to lightwave communication systems and, more particularly, to monitoring and communicating status via optical amplifiers in such systems.

BACKGROUND OF THE INVENTION

Lightwave communication systems typically employ optical amplifiers as in-line amplifiers for boosting signal levels to compensate for losses in a transmission path, as power amplifiers for increasing transmitter power, and as pre-amplifiers for boosting signal levels before receivers. In a wavelength division multiplexing (WDM) system, in which many optical channels at different wavelengths are combined into a composite optical signal, optical amplifiers are particularly useful because of their ability to amplify many optical channels simultaneously. Typical amplification schemes include optical amplifiers that employ rare earth-doped fiber amplifiers, such as erbium-doped fiber amplifiers, which are pumped with diode lasers, and Raman amplification in which diode-laser pumping generates gain through stimulated Raman scattering in an optical fiber.

As is well known, the performance of optical amplifiers can be affected by the aging of components, temperature-induced variations, and other factors. As such, various monitoring techniques are often used to detect and report anomalies so that corrective action can be taken. In some systems, for example, a separate supervisory optical channel (e.g., telemetry channel) may be used for communications between network elements. Some conventional uses of the supervisory channel include network monitoring functions, alarm reporting and indications, messaging, maintenance, and so on. In the alarm application, for example, the supervisory channel can be used to carry an alarm indication or signal between network elements so that appropriate action can then be taken by the respective network elements. The supervisory optical channel is assigned a separate wavelength, typically out of band, from the other traffic-carrying optical channels (wavelengths).

In conventional arrangements, the supervisory channel is typically processed using components in the optical amplifiers. For example, optical amplifiers include components for receiving, detecting, filtering (for add/drop), converting (e.g., optical to electrical to optical), and regenerating the supervisory channel at each node. In this manner, the supervisory channel can be processed at each node to carry out the aforementioned monitoring and reporting functions. However, processing the supervisory channel at each optical amplifier node adds complexity and cost to the optical amplifiers.

SUMMARY OF THE INVENTION

According to the principles of the invention, the status of a network element can be communicated in an optical transmission system using an optical amplifier arrangement that amplifies incoming optical signals and that also transfers status information to a separate optical signal without directly processing the separate optical signal within the optical amplifier.

In one illustrative embodiment, the apparatus includes a segment of erbium-doped fiber (EDF) coupled to a transmission fiber, a pump source for supplying a pump signal to the EDF, and a modulator for applying one or more tones onto the pump signal. The tones are indicative of one or more status conditions about the optical amplifier. Optical signals propagating through the EDF include optical signals for carrying data (e.g., traffic-carrying optical channels) as well as an optical signal for transporting status, such as a supervisory (telemetry) optical signal. The modulated tones from the pump signal are transferred to the supervisory signal as a result of the Raman effect between the pump signal and the supervisory signal in the transmission fiber. More specifically, the pump wavelength and the wavelength of the supervisory signal are such that the modulated tone (or tones) on the shorter wavelength pump signal is transferred to the longer wavelength supervisory signal.

In this manner, the supervisory signal does not have to be separately processed in the optical amplifier as in prior art arrangements, thus saving on components and cost. For example, the optical amplifier does not require components for filtering (dropping) the incoming supervisory signal, for converting the signal from optical to electrical for processing, for processing the supervisory signal (e.g., controllers and the like), and for converting and adding the supervisory signal to the other amplified signals.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION

Although the illustrative embodiments described herein are particularly well-suited for use in a wavelength division multiplexed system (WDM) comprising rare earth-doped fibers such as erbium-doped fiber amplifiers, and shall be described in this exemplary context, those skilled in the art will understand from the teachings herein that the principles of the invention may also be employed in conjunction with other types of optical communication systems and other types of optical amplifiers. Accordingly, the embodiments shown and described herein are only meant to be illustrative and not limiting.

Figure 1:
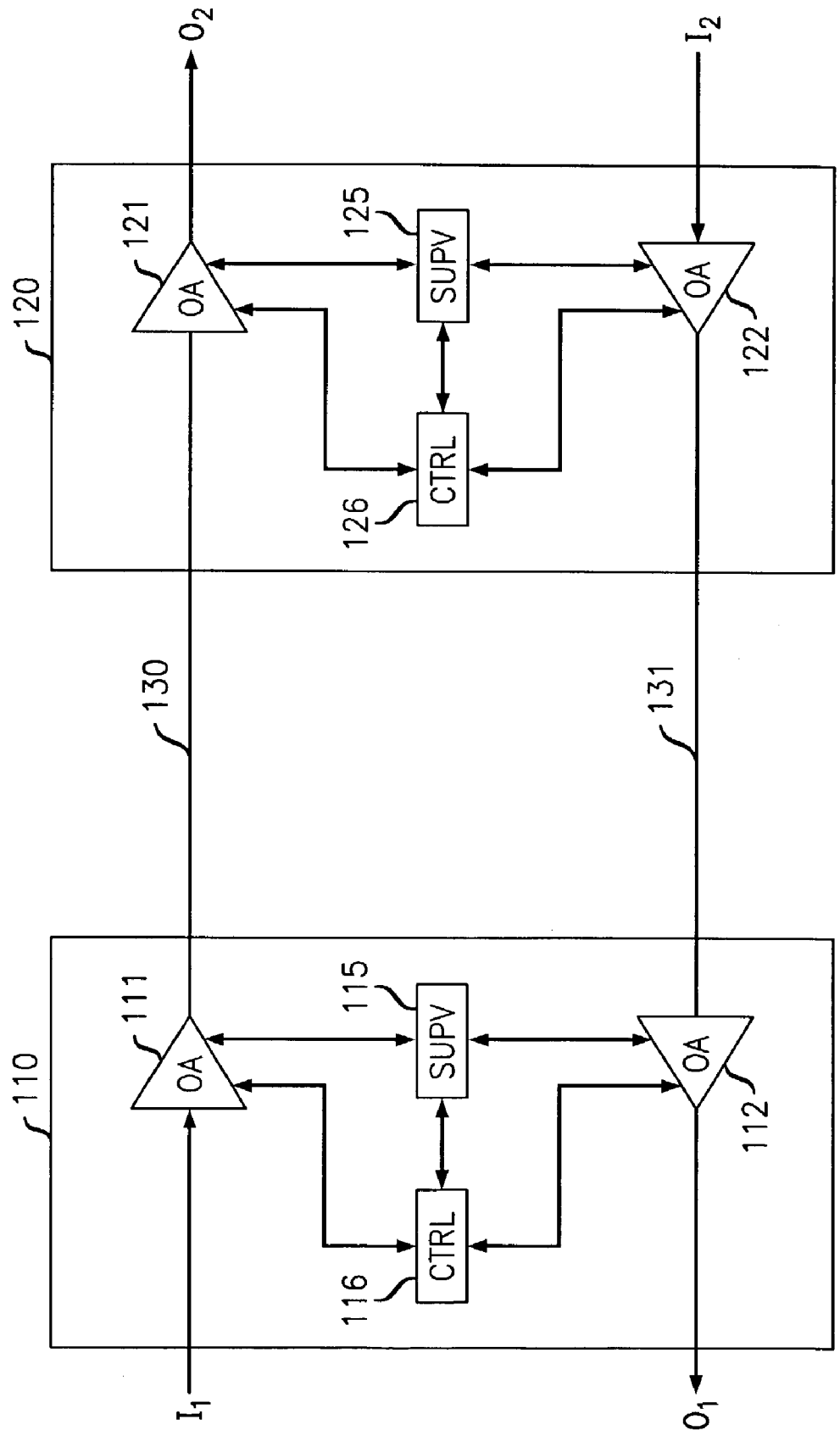
FIG. 1 shows a simplified configuration of a portion of a typical optical transmission system employing supervisory control signals.

Before describing specific embodiments of the invention, a brief overview of a typical optical transmission system employing supervisory signals will be provided. More specifically, FIG. 1 shows an illustrative optical transmission system 100 that includes network element 110 and network element 120 coupled by transmission facilities, such as optical fiber paths 130 and 131. In this example, optical transmission system 100 is configured to provide west to east communications via optical fiber path 130 and east to west communications via optical fiber path 131.

Network element 110 includes optical amplifier 111 for receiving information-bearing optical signals $I_1$ (i.e., traffic signals), amplifying the traffic signals, and supplying these amplified signals along optical fiber path 130 in the west to east direction to network element 120. Network element 110 further includes optical amplifier 112 for receiving and amplifying optical signals supplied from network element 120 in an east to west direction along optical fiber path 131 and supplying these amplified signals as output signals $O_1$. Network element 110 also includes a supervisory unit 115 for providing the necessary supervisory and telemetry functions associated with optical amplifiers. The operation of supervisory and telemetry packs is well known to those skilled in the art. In general, a supervisory pack is used to facilitate messaging across a supervisory data link established between optical components such as optical amplifiers and the like. As previously indicated, the supervisory data link, supervisory signal, or supervisory channel, which are referred interchangeably herein, is a separate channel from the information-bearing optical signals, i.e., traffic channels. The supervisory signal can either be co-propagating or counter-propagating with respect to the traffic channels in each of optical fiber paths 130 and 131, however, a counter-propagating supervisory signal will be assumed for purposes of the description that follows.

Network element 110 further includes a controller 116 for controlling the operation of the various components within network element 110. Some optical transmission systems include a hierarchical control architecture. For example, each circuit pack (e.g., optical amplifier circuit pack) in a network element may include a separate controller, e.g., a board or pack-level controller to locally control the functions within the circuit pack. Additional controllers above the circuit pack level may also be used in the control hierarchy to communicate with the various circuit pack controllers and to carry out different functions, e.g., a "shelf controller" to control an entire "shelf" of circuit packs. Controller 116 for network element 110 is one such example. The basic operation of controllers, such as controller 116, is also well known to those skilled in the art.

Similarly, network element 120 includes optical amplifiers 121 and 122 for receiving, amplifying, and supplying optical signals in the respective directions along optical fiber paths 130 and 131, respectively. More specifically, optical amplifier 122 receives information bearing optical signals 12 (i.e., traffic signals), amplifies these traffic signals, and supplies the amplified signals along optical fiber path 131 in the east to west direction to network element 110. Optical amplifier 121 receives and amplifies optical signals supplied from network element 110 in a west to east direction along optical fiber path 130 and supplies the amplified signals as output signals $O_2$. Network element 120 also includes supervisory unit 125 and controller 126 for carrying out similar functions as those described for the corresponding elements in network element 110.

In normal operation, optical amplifier 111 in network element 110 amplifies information-bearing optical signals (i.e., traffic channels) and transmits these optical signals along optical fiber path 130. Supervisory units 115 and 125 would supply the supervisory signal in a counter-propagating direction along fiber path 130. As previously indicated, the supervisory signal is typically used for messaging, alarm reporting, and so on between network elements 110 and 120. For example, optical amplifier 111 in network element 110 would receive the counter-propagating supervisory signal, filter and drop it from the information-bearing optical signals, and provide it to supervisory unit 115 to facilitate control of network element 110 in conjunction with controller 116. The same principles of operation apply for communication in optical fiber path 131 involving the respective components of network elements 110 and 120.

As shown in FIG. 1, conventional systems require processing of the supervisory signal at each optical amplifier location. Because of the extra components required in the optical amplifiers and the potentially large number of optical amplifiers in a transmission system, the cost of the individual amplifiers is typically a cost driver for the overall system.

Accordingly, we have discovered an alternative, cost-effective solution for both amplifying optical signals and communicating status in an optical transmission system. More specifically, an optical transmission system according to the principles of the invention includes one or more optical amplifier nodes that provide amplification of optical signals and that also use the supervisory signal to communicate status without requiring the components typically used for processing the supervisory signal in an optical amplifier.

Figure 2:
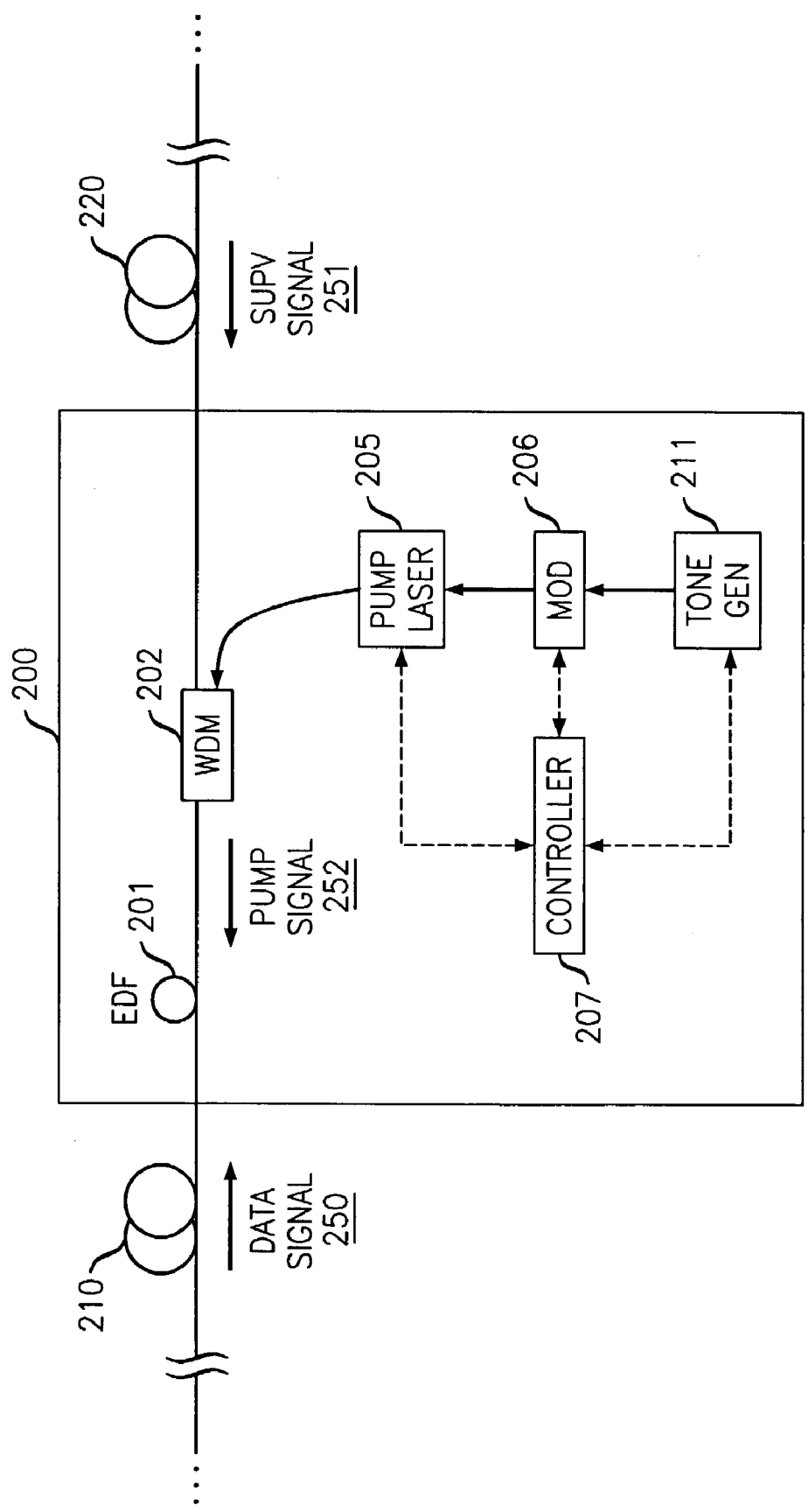
FIG. 2 shows an illustrative embodiment of an apparatus for use in an optical transmission system according to the principles of the invention.

FIG. 2 shows one illustrative embodiment of an optical amplifier node according to the principles of the invention. The optical amplifier node shown in FIG. 2 could therefore be substituted for one or more of the network elements (nodes) in optical transmission system 100 shown in FIG. 1. As shown in FIG. 2, node 200 includes an optical fiber amplifier 201, which can be a segment of erbium-doped fiber (EDF) as shown in this example, and pump laser 205, which is coupled to EDF 201 via a wavelength division multiplexer/coupler (WDM) 202. Node 200 further includes a modulator 206 coupled to pump laser 205 for modulating pump signal 252 supplied by pump laser 205. In this illustrative embodiment, tone generator 211 is coupled to modulator 206. Controller 207 is coupled to or otherwise communicates with pump laser 205, modulator 206 and tone generator 211. By way of example only, these components could be separate or integrated within a single pump control device or circuit pack. It is contemplated that optical amplifier node 200 is coupled to other nodes in the optical transmission system via transmission fibers 210 and 220.

In operation, pump laser 205 supplies pump signal 252 to EDF 201 via WDM coupler 202 in a manner that is well known to those skilled in the art. In particular, the wavelength of pump signal 252 is selected to provide, in a conventional manner, pumping energy so that EDF 201 amplifies optical signals passing through EDF 201 in either direction. In this example, data signal 250 (e.g., one or more traffic-carrying optical channels) propagates through EDF 201 in a easterly direction while supervisory signal 251 is propagating through EDF 201 in a westerly (or counter-propagating) direction with respect to data signal 250. This type of arrangement, e.g., counter-propagating supervisory signal, is a typical configuration for optical transmission systems, but should not be construed as a limitation as other arrangements, such as a co-propagating supervisory signal, are also contemplated by the teachings herein. As shown, pump laser 205 is also arranged in this illustrative embodiment to provide a counter-propagating pump signal 252, however, it will be appreciated by one skilled in the art that a co-propagating pump signal could also be used depending on system design considerations.

The wavelength of pump signal 252 is also a matter of design choice, although pump wavelengths in the range of 1420 nm–1490 nm are considered suitable for amplification of signals in the conventional C and L bands. Again, the selection of appropriate pump wavelengths will depend on other system design considerations that would be well known to one skilled in the art.

According to the principles of the invention, modulator 206 is used to modulate the pump signal provided by pump laser 205. Controller 207 is used to carry out conventional control functions for optical amplifier node 200 as well as to control the modulation that is imparted to pump laser 205 according to principles of the invention. For example, controller 207 can be a microprocessor-based controller that provides local control of pump laser 205, e.g., controlling the laser bias current, monitoring the backfacet voltage, and so on, according to well-known techniques.

According to one illustrative embodiment, modulator 206 is used to modulate the pump laser 205 with tones (e.g., low frequency tones such as 10 MHz) supplied by tone generator 211 to indicate a status and/or alarm condition that exists in node 200. By way of example, different tones could be prescribed and associated with various events and/or status conditions, e.g., a power supply failure, the status of the laser bias current, and so on. Various combinations are also possible and contemplated by the teachings herein. For example, certain tones can be allocated for alarm status, certain other tones for performance monitoring, and so on. In this manner, different tones in each category can then be used to convey different messages/indications, e.g., a set of tones to convey different alarm conditions, and so on.

As a specific example in the performance/status monitoring domain, consider the laser bias current of pump laser 205. In particular, a laser pump generally degrades with time and usage, so applying the same laser bias current will eventually result in a degraded output from a pump laser over time. Such a condition can be detected by monitoring a backfacet voltage reading from pump laser 205 provided to controller 207. While appropriate local adjustments can be made at node 200 in response to this condition, e.g., via controller 207, according to well known techniques, modulation of the pump signal according to the principles of the invention can communicate the status of this event/condition in the system.

As another example, one can use a different set of tone frequencies to report temperature of pump laser 205 and the bias current of the pump's thermoelectric cooler. Different modulation techniques such as amplitude modulation (AM) or frequency shift keying (FSK) can be used for modulating the pump signal. In amplitude modulation, the frequency of the tone is fixed but its amplitude varies in proportion with the level of the signal being communicated. In FSK, the amplitude of the tone is fixed, but its frequency is shifted in proportion with the information level. For example, in reporting pump laser bias current using amplitude modulation, the amplitude of the modulating tone varies in proportion to the level of bias current. If using FSK, the tone frequency will be shifted in proportion to the bias current level. It should be noted that these examples are meant to be illustrative and not limiting in any manner as others will be apparent to one skilled in the art. In particular, other examples for performance monitoring, alarm generation/reporting, tone modulation techniques, etc, are contemplated by the teachings herein.

Controller 207 would be used to determine the appropriate status condition and/or alarm/failure condition to monitor and report and also control modulator 206 in applying the correct tone to pump laser 205. It should be noted that the number of tones, the selection of appropriate frequencies, and the application of tones via modulation of the pump signal (e.g., amplitude modulation, FSK, etc.) are a matter of design choice and different techniques and/or selections will be apparent to one skilled in the art. The generation and application of tones could be accomplished in a number of ways, several of which are described, for example, in an article by G. Bendelli et al. entitled "Optical Performance Monitoring Techniques", Proceedings of the European Conference on Optical Communication (ECOC 2000), vol. 4, pages 113–116, September 2000 (and in references cited therein), all of which are incorporated by reference herein. These examples are only meant to be illustrative and not limiting in any manner.

In operation, the modulated pump signal 252 (with a tone frequency imparted by modulator 206 and tone generator 211) propagates in a counter-propagating manner with respect to data signal 250 and co-propagating with respect to supervisory signal 251. The modulated pump signal 252 is multi-functional in that it provides pump energy to EDF 201 to cause the amplification of data signal 250 and supervisory signal 251 passing therethrough, carries information about status and/or conditions about node 200, and also supplies pump energy for Raman amplification within transmission fiber 210. As modulated pump signal 252 propagates along transmission fiber 210, Raman effect (Raman amplification) will result in a transfer of the modulation in pump signal 252 to supervisory signal 251. In another embodiment, amplifier node 200 can be coupled to a segment of dispersion compensating fiber (DCF), which is well known as being ideally suited for Raman amplification/effect due to its characteristics.

The Raman "effect" is well known in that stimulated Raman scattering within a transmission fiber will result in interactions between signals having shorter wavelengths and signals having longer wavelengths. For example, one such result is the transfer of power from the shorter wavelength channels to the longer wavelength channels. Accordingly, the selection of appropriate wavelengths for pump signal 252 and supervisory signal 251 will ensure that the modulation from a shorter wavelength pump signal 252 is transferred to longer wavelength supervisory signal 251. By way of example only, the wavelength of pump signal 252 could be 1460 nm while the wavelength of supervisory signal 251 could be 1530 nm. Other examples of wavelength assignments will be apparent to one skilled in the art.

Modulated supervisory signal 251 would then propagate to another node (network element) in the system where it would be processed in a conventional manner, e.g., tapped off from the main signal path, converted to electrical form, processed by appropriate controller circuitry (e.g., microprocessors), and so on. In this process, the tone could be extracted from supervisory signal 251 using techniques well known to those skilled in the art. For example, analog (e.g., electrical filter) or digital (e.g., DSP-based processing) techniques can be used to detect the presence of a tone in supervisory signal 251. After detecting the presence of the particular tone and determining the particular associated condition that it represents (as prescribed), then appropriate reporting and/or other remedial action could then be carried out based on the information conveyed by the extracted tone.

It should be noted that the above embodiments used a counter-propagating supervisory signal, but it is possible to apply the principles of the invention to a system that uses a co-propagating supervisory signal. However, certain other adjustments may be necessary. For example, it may be necessary in certain systems to ensure that the frequency of the tones used for modulating the pump laser are lower than the low cutoff frequency of the data receiver in the system. Other such examples will be apparent to one skilled in the art.

It should also be noted that several factors will dictate overall system design, e.g., loss budget for determining the number and placement of optical amplifiers, dispersion management considerations, and so on. Such factors and system design considerations are well known to those skilled in the art and, as such, various modifications of the embodiments described herein may be made to tailor a solution to a particular system configuration. For example, an optical amplifier arrangement according to the principles of the invention may be used in place of one or more conventional repeater nodes in an optical transmission system. The amplifier arrangement could be used in place of repeater nodes that have optical amplifiers comprising rare earth-doped fiber (e.g., erbium), Raman-based repeater nodes (e.g., Raman pump and dispersion compensating fiber (DCF) combinations), and so on. Those skilled in the art will also recognize that other adjustments may be needed in a system that employs one or more of the optical amplifier nodes according to the principles of the invention. For example, dispersion compensation modules and conventional supervisory optical channel processing components may be incorporated, as needed, at other nodes in the system.

Figure 3:
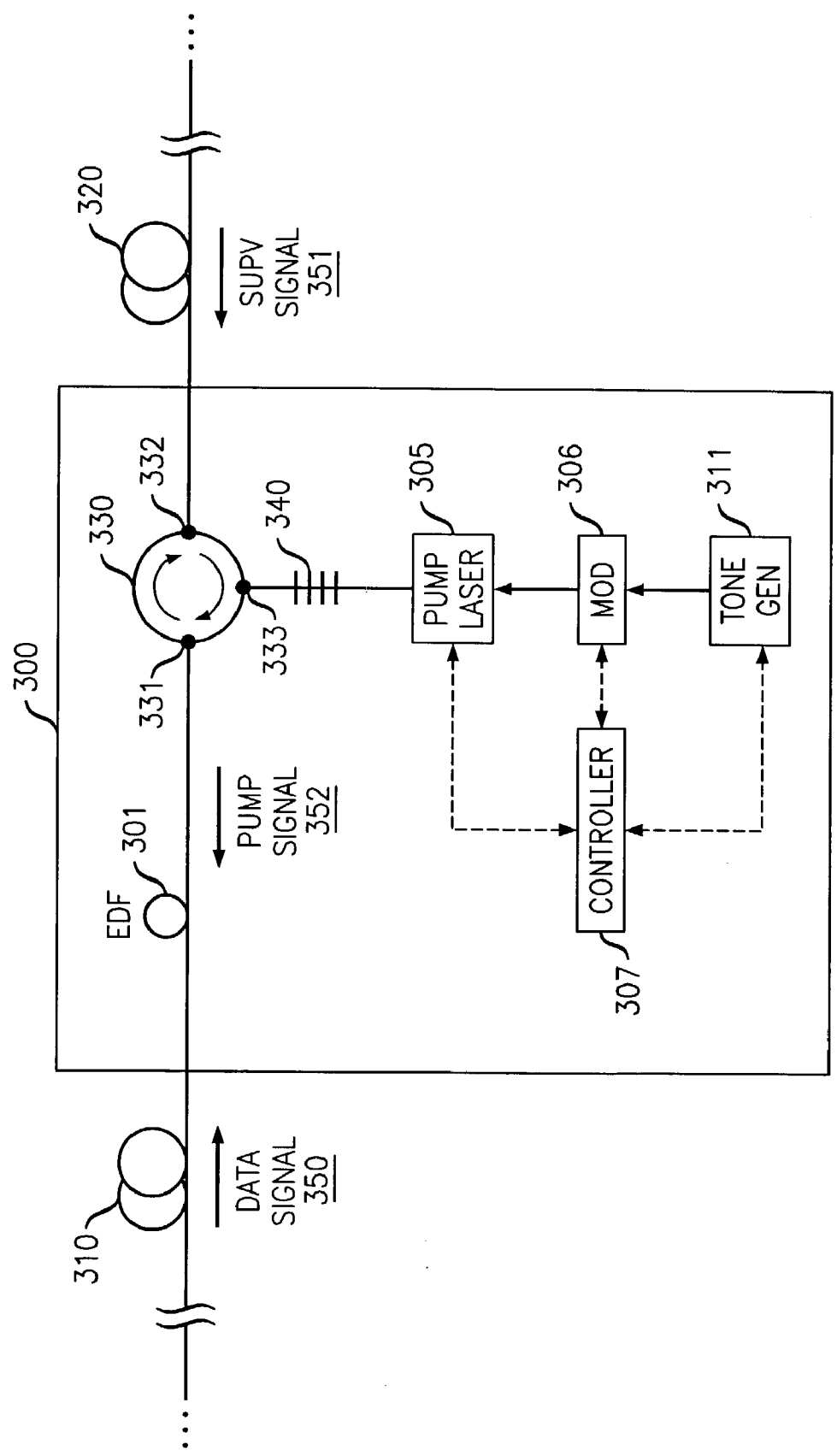
FIG. 3 shows another illustrative embodiment of an apparatus for use in an optical transmission system according to the principles of the invention.

FIG. 3 shows another illustrative embodiment of an optical amplifier node 300 according to the principles of the invention. In general, optical amplifier node 300 includes similar components as shown in optical amplifier node 200 in FIG. 2 with a few notable differences. For sake of brevity, only the differences will be discussed in detail.

Optical amplifier node 300 is coupled to transmission fibers 310 and 320 and includes EDF 301, pump laser 305, modulator 306, tone generator 311, and controller 307, all of which operate similarly as described in the preceding embodiments. Optical amplifier node 300 further includes optical circulator 330 and a fiber grating 340 such that optical circulator 330 is coupled to EDF 301 via a first port 331, to transmission fiber 320 via a second port 332, and to pump laser 305 via a third port 333. Fiber grating 340 is disposed between pump laser 305 and third port 333 of optical circulator 330. Optical circulators and fiber gratings are both well-known devices. In general, an optical circulator is a directional optical coupler device that distributes ("circulates") optical signals among multiple ports. A fiber grating has many different uses but, in general, is a fiber-based optical device that can be designed to reflect a narrow portion of an optical spectrum while transmitting the rest of the spectrum. In this illustrative embodiment, it is contemplated that fiber grating 340 is a short period Bragg grating.

In operation, incoming data signal 350 is amplified by EDF 301 and enters first port 331 of optical circulator 330 and exits from second port 332 for transmission via transmission fiber 320. Pump laser 305 generates modulated pump signal 352 in a similar manner as described in the preceding embodiments. In this embodiment, modulated pump signal 352 supplied by pump laser 305 enters optical circulator 330 via third port 333 and exits via first port 331 towards EDF 301. Supervisory signal 351, which is also shown here to be counter-propagating relative to data signal 350 as in the preceding embodiments, enters circulator 330 via second port 332 and exits via third port 333. Fiber grating 340 is tuned, programmed, or otherwise designed to reflect supervisory signal 351 (e.g., at 1531 nm) such that supervisory signal 351 is reflected back to and re-enters optical circulator 330 via third port 333 and exits first port 331 for subsequent amplification by EDF 301 and transmission via transmission fiber 310.

Fiber grating 340 also performs another function in this illustrative embodiment in that it passes (i.e., is transmissive and not reflective) of other optical signals (wavelengths) that may be routed from transmission fiber 320 back towards optical amplifier node 300. For example, unwanted back reflections could propagate via transmission fiber 320 to optical amplifier node 300. These unwanted optical signals would similarly be routed from second port 332 to third port 333 of optical circulator 330, through fiber grating 340, and then would terminate, for example, at pump laser 305. By way of example, pump laser 305 may include an optical isolator or be otherwise designed such that back reflections would terminate without adversely affecting operation.

Some examples of such unwanted back reflections are signals that propagate in a backward direction, relative to a forward propagating optical signal such as data signal 350, due to fiber Rayleigh scattering and/or reflections at connectors and so on. In particular, a fraction of a forward propagating optical signal can be coupled in the backward direction as a result of these effects. Adding to the problem, backscattered light signals may undergo further Rayleigh scattering or be reflected off other connectors and be coupled back into the forward direction. This double-reflected optical signal will mix with the original forward-propagating optical signal at the receiver location causing interference. This double reflection can occur at multiple segments of the transmission medium leading to multi-path interference (MPI), which is a well-known phenomenon in optical fiber transmission.

Accordingly, MPI and other deleterious effects caused by back reflections can be substantially mitigated by using an optical amplifier node such as the one disclosed in the illustrative embodiment shown in FIG. 3. Moreover, by reducing the effects that might otherwise be caused by MPI and other such impairments, optical amplifier node 300 can be configured to provide more gain than what might otherwise be possible if MPI were a concern. For example, the length of EDF 301 can be tailored accordingly to provide more gain since the concern about amplifying back reflections is effectively addressed by the embodiment shown in FIG. 3.

The foregoing is merely illustrative of the principles of the invention. Those skilled in the art will be able to devise numerous arrangements, which, although not explicitly shown or described herein, nevertheless embody those principles that are within the spirit and scope of the invention. Such modifications are therefore contemplated by the teachings herein. Accordingly, the scope of the invention is only limited by the claims appended hereto.

We claim:

1. A method of providing status information in an optical communications system, said system being capable of transmitting a plurality of optical signals including a separate supervisory optical signal along an optical transmission path, the method comprising the steps of:

modulating an optical pump signal with the status information;

supplying the modulated pump signal to an optical amplifier for amplifying the plurality of optical signals, the optical amplifier being adapted to supply the modulated pump signal to the optical transmission path; and transferring the modulation in the pump signal to the separate supervisory optical signal via Raman effect in the optical transmission path such that the status information is carried by the separate supervisory optical signal, wherein the pump signal and the separate supervisory optical signal are both counter-propagating relative to the plurality of optical signals and said transfer occurs without directly processing the separate supervisory optical signal.

2. The method according to claim 1 wherein the pump signal has a first wavelength and wherein the separate supervisory optical signal has a second wavelength that is longer than the first wavelength.

3. The method according to claim 1, wherein the modulating step further comprises the steps of modulating the pump signal with at least one tone.

4. The method according to claim 3, wherein the at least one tone is adapted to provide at least one of alarm generation, performance monitoring, and messaging functions.

5. A method of transmitting status information via a separate supervisory optical signal in an optical transmission path including at least one optical amplifier and a pump source for generating a pump light signal for the optical amplifier, the method comprising:

modulating the pump light signal with the status information;

supplying the modulated pump light signal to the optical transmission path; and transferring the modulation in the pump light signal to the separate supervisory optical signal via Raman effect in the optical transmission path, such that the status information is carried by the separate supervisory optical signal, wherein the pump signal and the separate supervisory optical signals are both counter-propagating relative to a plurality of other optical signals and said transfer occurs without directly processing the separate supervisory optical signal.

6. A method of transmitting status information in an optical transmission path, the method comprising:

modulating a pump signal supplied by an optical amplifier pumping source with at least one tone;

supplying the modulated pump signal to the optical transmission path, and transferring the modulation in the pump signal to a separate supervisory optical signal via Raman effect in the optical transmission path, such that the status information is carried by the separate supervisory optical signal wherein the pump signal and the separate supervisory optical signal are both counter-propagating relative to a plurality of other optical signals and said transfer occurs without directly processing the separate optical signal.

7. The method according to claim 6, wherein the pump signal has a first wavelength and wherein the separate supervisory optical signal has a second wavelength that is longer than the first wavelength.

8. The method according to claim 6, wherein the at least one tone is adapted to provide at least one of alarm generation, performance monitoring, and messaging functions.

* * * * *